May 5, 1953     H. DAVIS ET AL     2,637,841
POSITION FINDING OF ELECTRICAL DISTURBANCES
Filed April 20, 1951
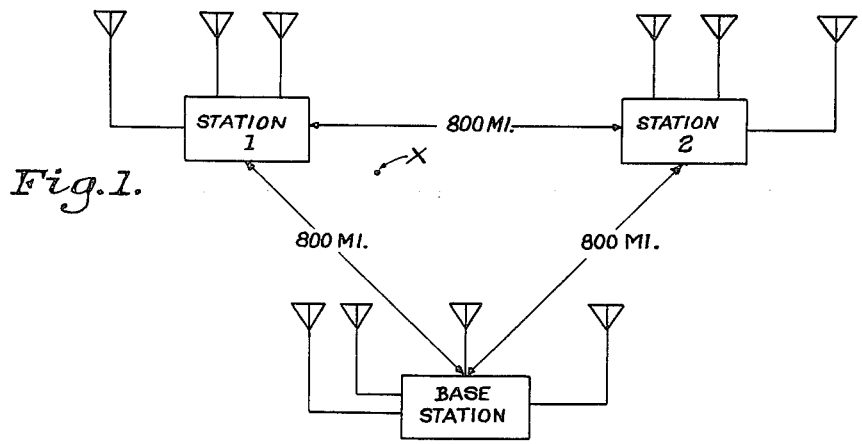
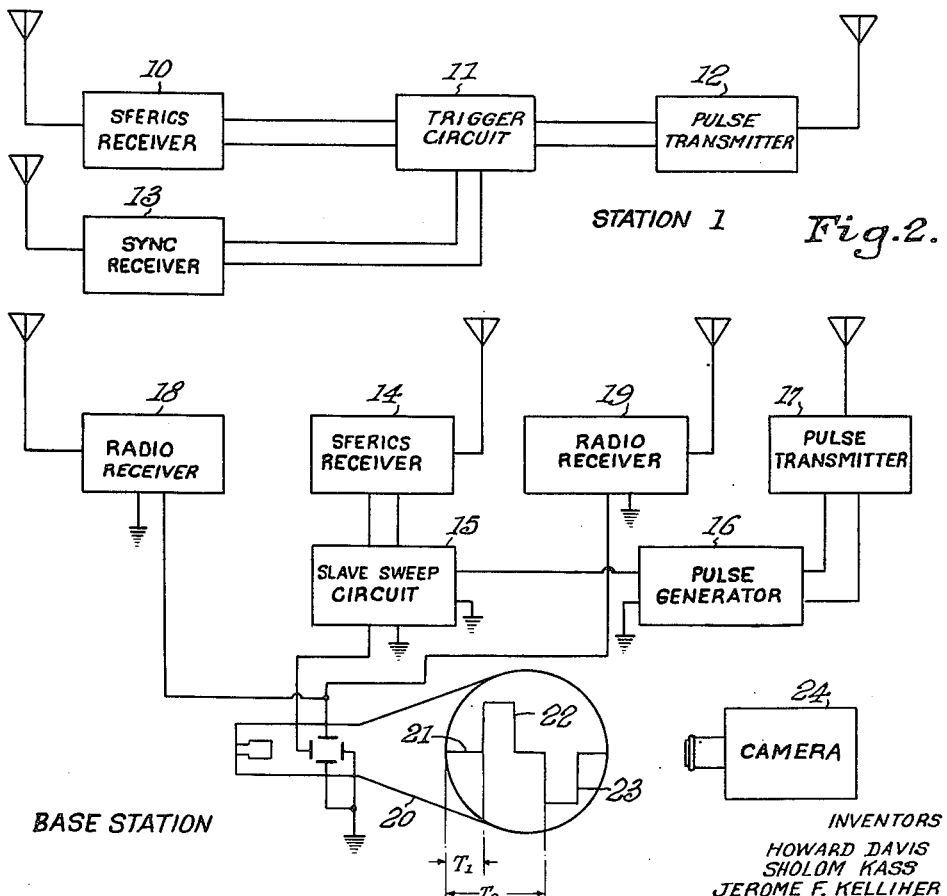
INVENTORS
HOWARD DAVIS
SHOLOM KASS
JEROME F. KELLIHER
LAWRENCE A. PICK
BY
Harry M. Saragovitz
ATTORNEY Patented May 5, 1953

2,637,841

UNITED STATES PATENT OFFICE 2,637,841

POSITION FINDING OF ELECTRICAL DISTURBANCES

Howard Davis, Long Branch, N. J., Sholom Kass, Rehovot, Israel, and Jerome F. Kelliher, Middletown, and Lawrence A. Pick, Little Silver, N. J., assignors to the United States of America as represented by the Secretary of the Army Application April 20, 1951, Serial No. 222,122

4 Claims. (Cl. 340—212)

(Granted under Title 35, U. S. Code (1952), sec. 266)

The invention described herein may be manufactured and used by or for the Government for governmental purposes, without the payment to us of any royalty thereon.

The present invention relates generally to meteorology and more particularly to a system for the location of atmospheric disturbances by the use of several widely spaced observation stations.

It is well known that certain meteorological situations, such as convective storms, are attended by severe electrical disturbances. The importance of this phenomenon becomes evident when it is remembered that standard hourly meteorological observations include the presence or absence of thunderstorms. It is also known that electrical discharges can occur in the upper atmosphere remote from the ground and that the existence and location of these discharges may be ascertained at points remote therefrom by means of the electromagnetic energy radiated from such discharges.

This radiant energy arises from a sudden electrical impulse which represents an abrupt flow of current due to an electrical discharge of the type often seen during lightning storms. Knowledge of the geographical location of areas of intense electrical activity is of considerable value to the meterologist, especially if the areas involved are those where few observations can be made by regular observers, areas such as oceans and sparsely populated land areas.

In the past, widely spaced observation stations with direction finding apparatus determined the bearing of an electrical disturbance and transmitted this information to a base station. From a plurality of bearings, the location of the disturbance could be found by triangulation at the base station. This method is disclosed in U. S. Patent 2,402,688 to Skurnick. The present system overcomes the necessity of transmitting the bearings of the electrical discharges from the observation stations to the base stations with its attendant difficulties.

The present invention detects and locates electrical disturbances by utilizing a plurality of widely spaced observation stations in combination with a base station. Differences in the time of transmission of electromagnetic energy from a disturbance to each of the stations is measured and indicated at the base station.

More specifically, the reception of electromagnetic energy from a disturbance triggers off a pulse transmitter at each of the observation stations and initiates a sweep on a cathode ray tube at the base station. The pulses generated at the observation stations are detected at the base station and applied to a cathode ray tube, and the resultant pattern on the cathode ray tube may be analyzed to obtain a measurement of the intervals between the times of reception, at any pair of stations, of the electromagnetic energy from a particular electrical disturbance. The operator of the base station may then plot the position of the electrical discharge by hyperbolic curves, since the locations of the observation stations are known.

It is, therefore, the primary object of this invention to provide a system for the rapid location of electrical disturbances.

A further object of this invention is to provide spaced observation stations and a base station to determine the geographical location of atmospheric discharges.

A still further object of this invention is to provide spaced observation stations and a base station with apparatus including pulse transmitters to determine the location of atmospheric discharge.

These and further objects will be more fully understood when the following description is read in connection with the accompanying drawing in which:

Figure 1 is a diagrammatic showing of the position finding system and

Figure 2 illustrates in block form the details of one observation station and the base station.

Referring now to the drawing and more particularly to Fig. 1, two observation stations 1 and 2 and the base station are shown located at the vertices of an equilateral triangle 800 miles on a side. Of course this distance is illustrative and could be varied within any reasonable limits. It is apparent that two or more stations can be utilized in any predetermined relation. With the stations placed as shown, a large area may be effectively explored to locate atmospheric disturbances evidencing the presence of storms.

In Fig. 2, observation station 1 and the base station are shown in detail. A sferics receiver 10 is located at station 1. Sferics is a term of art derived from the word atmospherics and used synonomously with lightning discharge, electrical disturbance and the like. Therefore, a sferics receiver is one that will detect the electromagnetic energy radiated from an atmospheric discharge. This is a conventional broad band radio receiver tuned to receive static disturbances in the 1 kilocycle to 1000 kilocycle range. The output signal from the receiver 10 is fed to a trigger circuit 11 which is of any well-known design such as a one-shot multivibrator. The single pulse from circuit 11 when applied to a pulse transmitter 12 triggers the transmitter. Also incorporated in station 1 is a synchronizing receiver 13, which is a conventional radio receiver detecting synchronizing pulses from the base station and applying them to the trigger circuit 11.

The base station also has a sferics receiver 14, similar to receiver 10, coupled to a slave sweep circuit 15 which comprises any well-known sweep generator of the saw tooth wave type. Also connected to the slave sweep circuit 15 is a pulse generator 16 of any conventional design adapted for intermittent or continuous operation according to the setting made by the base station operator. The slave sweep circuit 15 is arranged to operate for one cycle upon the reception of a signal from either the sferics receiver 14 or the pulse generator 16. For example, the circuits disclosed in U. S. Patents 2,241,256 to Gould or 2,350,064 to Schrader et al. can be utilized. The pulse generator 16 also triggers the pulse transmitter 17.

Two radio receivers 18 and 19, preferably tuned to receive pulses on carriers of different frequencies, are coupled to the vertical deflecting plates of cathode ray tube 20 while the horizontal deflecting plates are connected to the slave sweep circuit 15. To aid in the observation of patterns traced on tube 20, a time base or other indicia may be superimposed on the cathode ray tube screen.

The operation of the position-finding system is as follows: The electromagnetic energy radiated from a lightning flash at X, shown in Fig. 1, is detected by sferics receiver 14 at the base station. This triggers slave sweep circuit 15 to initiate the trace 21 on cathode ray tube 20. The flash is also picked up by sferics receiver 10 at station 1 and triggers pulse transmitter 12 through trigger circuit 11. At station 2 the same operation takes place. The pulses from stations 1 and 2 are detected by radio receivers 18 and 19, respectively, at the base station, and applied to the vertical deflecting plates of cathode ray tube 20. The resultant display of the pulses as pips 22 and 23 on the indicia marked screen indicates the difference in time of arrival of electromagnetic energy from a static flash among the observation stations and the base station. Preferably, radio receivers 18 and 19 are connected so that the pip 22 from receiver 19 will be positive and the pip 23 from receiver 20 negative to aid in establishing the time difference between the pulses. From the present example, it can be seen that the position of the flash X will cause the pulse from station 1 to be received prior to the pulse from station 2. The time intervals $T_1$, $T_2$ and $T_2 - T_1$ may now be utilized to plot the exact position of the flash X. The differences between these intervals locates the atmospheric discharge on three hyperbolas which will intersect in a curvilinear triangle indicating the origin of the disturbances. For a more detailed description of the manner of plotting the hyperbolas, reference should be made to chapters 3 and 6 of "Loran" by Pierce, McKenzie and Woodward, published 1948 by McGraw-Hill Book Company.

Since the difference in atmospheric conditions can result in a slightly different time for pulses to travel from the observation stations to the base station, a method of calibrating the system may be used if greater accuracy is desired. This is accomplished by the excitation of pulse generator 16 which triggers both the slave sweep circuit and the pulse transmitter 17. The transmitted pulses are received at station 1 by synchronizing receiver 13 and by a similar receiver at station 2. The output from the synchronizing receiver 13 triggers circuit 11 which in turn triggers pulse transmitter 12. A similar operation takes place at station 2. The time difference between the received pulses will be used as a correction factor in calculating the position of flash X.

The cathode ray tube 20 is preferably photographed in any well-known manner by camera 24 since this allows a far greater number of indications to be recorded than if visual means were used, which is of course possible. One conventional method for such photography is described in chapter 16 of "Cathode Ray Tube Displays" by Soller, Starr and Valley, published 1948 by McGraw-Hill Book Company. If direct visual observation is preferred, a long persistence screen may be employed on cathode ray tube 20 to facilitate the observation of the pips 22, 23.

In case of interference that prevents an accurate determination of the time differences of the pulses on the cathode ray tube, the following method can be used: The trigger circuit 11 can be made insensitive to the output of receiver 10 until a synchronizing pulse is received by synchronizing receiver 13. Then trigger circuit 11 will be in condition to trigger the pulse transmitter 12 only for the first static disturbance received after the synchronizing pulse. If this method is used, there will be no confusion at the base station in the event of excessive interference.

A system for the rapid location of electrical disturbances in an accurate manner has been described and illustrated. It will be obvious to those skilled in the art that various changes and modifications may be made therein without departing from the invention which is limited only by the appended claims.

What is claimed is:

1. A meteorological system to locate the position of electrical disturbances comprising a plurality of observation stations and a base station, said stations remote from said disturbances, each of said observation stations including a pulse transmitter, trigger means coupled to said pulse transmitter, means for detecting electromagnetic energy radiated from said disturbances coupled to said trigger means so that upon detection of said energy, one pulse will be generated by said transmitter, said base station including indicating means, means responsive to electromagnetic energy radiated from said disturbances for exciting said indicating means, pulse receiving means, said receiving means generating signals in response to said pulses and applying said signals to said indicating means so that the time difference of reception of electromagnetic energy radiated from said disturbances among all of said stations may be ascertained.

2. A meteorological system for locating the position of electrical disturbances comprising a plurality of observation stations and a base station, said stations remote from said disturbances, each of said observation stations including a pulse transmitter, means responsive to electromagnetic energy radiated from said disturbances for triggering said pulse transmitter whereby signals are generated, said base station including a cathode ray tube, means for detecting electromagnetic energy radiated from said disturbances coupled to said tube, a plurality of pulse receivers corresponding in number to said observation stations for receiving said signals, said pulse receivers coupled to said tube so that said cathode ray tube will display an indication of the time differences of reception of electromagnetic energy radiated from said disturbances among all of said stations.

3. A meteorological system for locating the position of electrical disturbances comprising a plurality of observation stations and a base station, said stations remote from said disturbances, each of said observation stations including a pulse transmitter, trigger means coupled to said pulse transmitter, means for the detection of electromagnetic energy radiated from said disturbances coupled to said trigger means so that upon detection of said energy, one pulse will be generated by said transmitter, said base station including a cathode ray tube, means for detecting electromagnetic energy radiated from said disturbances coupled to said tube, a plurality of pulse receivers corresponding in number to said observation stations, said pulse receivers coupled to said tube so that said cathode ray tube will display an indication of the time difference of reception of electromagnetic energy radiated from said disturbances among all of said stations.

4. A meteorological system to locate the position of electrical disturbances comprising a plurality of observation stations and a base station, said stations remote from said disturbances, each of said observation stations including first means for the detection of electromagnetic energy radiated from said disturbances, second means responsive to said first means for transmitting signals indicative of the detection of electromagnetic energy radiated from said disturbances, third means for the reception of pulses coupled to said second means, said second means responsive to said third means for transmitting signals indicative of the reception of said pulses, said base station including receiving means, pulse transmitting means, and indicating means, said receiving means and pulse transmitting means coupled to said indicating means, fourth means for detecting electromagnetic energy radiated from said disturbances, fifth means responsive to said fourth means for exciting said indicating means, said receiving means detecting said signals so that said pulse transmitting means may be utilized to calibrate said system to compensate for varying transmission times from said observation stations to said base station whereby the time difference of detection of electromagnetic energy radiated from said disturbances among all of said stations may be ascertained.

HOWARD DAVIS.
SHOLOM KASS.
JEROME F. KELLIHER.
LAWRENCE A. PICK.

References Cited in the file of this patent

UNITED STATES PATENTS

| Number | Name | Date |
| --- | --- | --- |
| 1,406,996 | Morrill | Feb. 21, 1922 |
| 2,402,688 | Skurnick | June 25, 1946 |
| 2,405,239 | Seeley | Aug. 6, 1946 |
| 2,428,966 | Gage | Oct. 14, 1947 |